UNITED STATES PATENT OFFICE 2,441,390

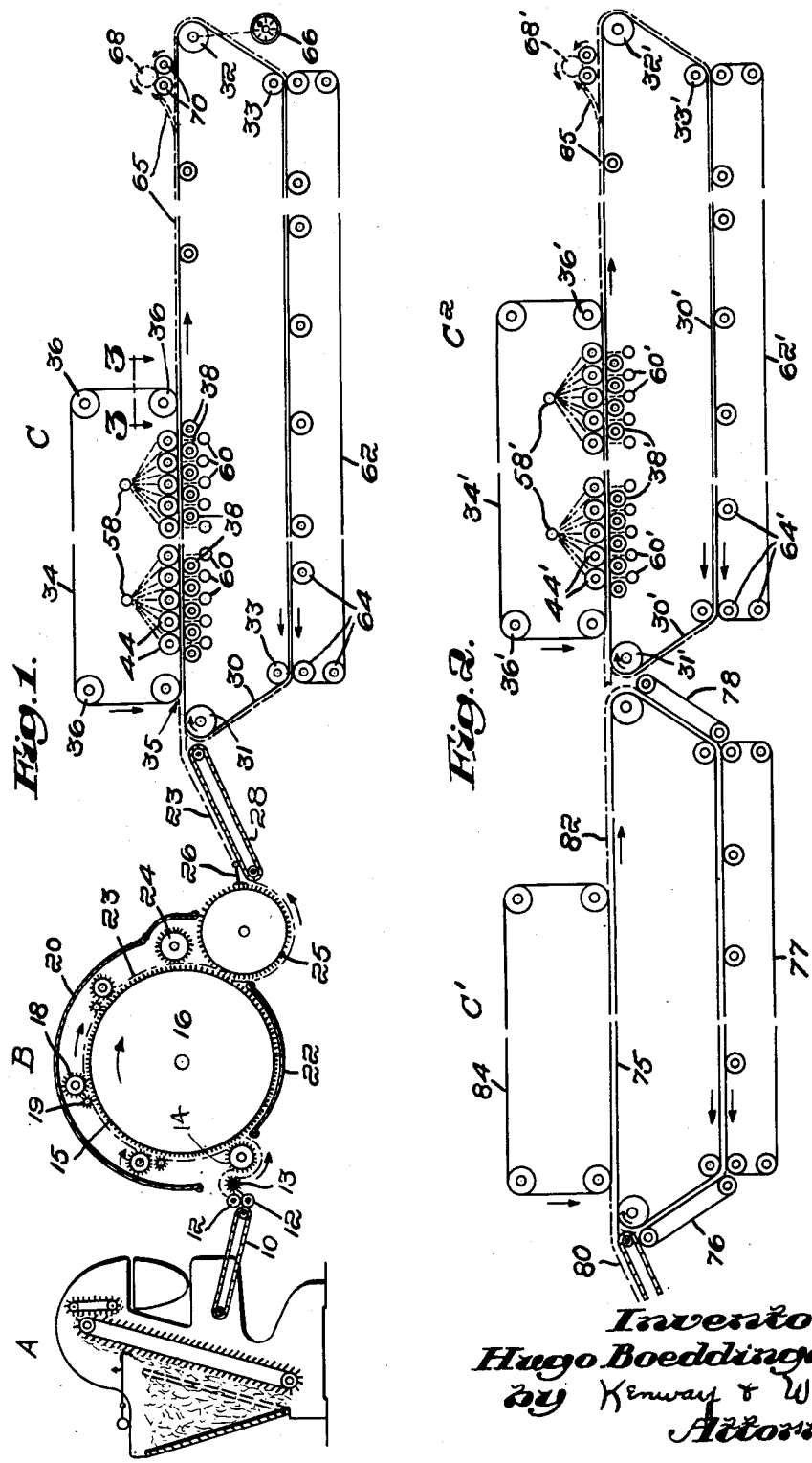

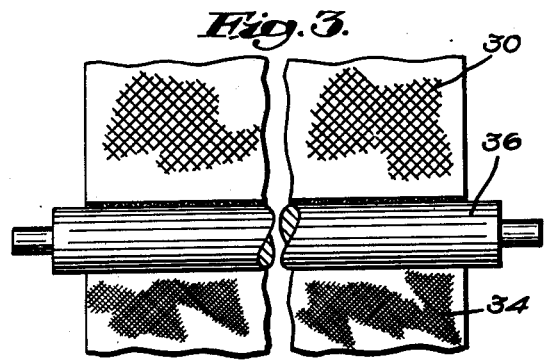
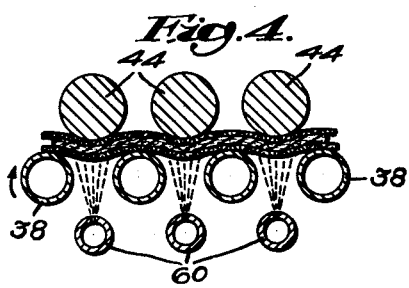
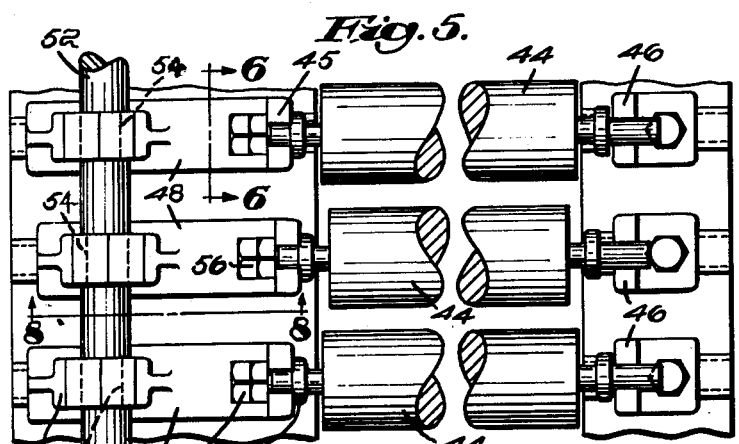
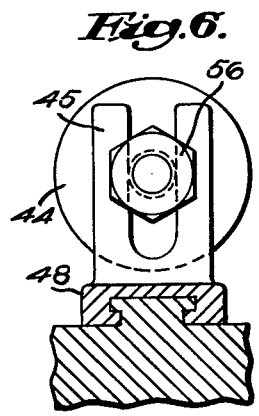
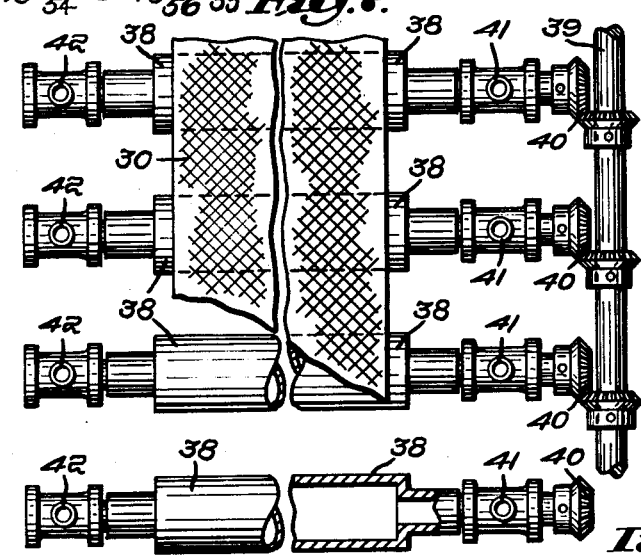
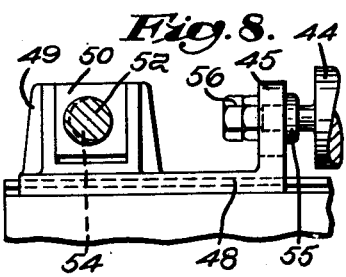

METHOD OF FELTING

Hugo Boeddinghaus, Greenwich, Conn., assignor to American Felt Company, Boston, Mass., a corporation of Massachusetts Application January 24, 1945, Serial No. 574,416

3 Claims. (Cl. 28—72.3)

This invention relates to a new and improved method and apparatus for the production of yardage felt particularly from fur fibres, Aralac, cotton, or mixtures of these and other fibres, and more especially to the continuous production of a partially or wholly felted product of this nature. Fur fibres are so soft, light and fluffy that they are difficult to handle and felting including such fibres has heretofore been made in the form of hoods or skirtings by blowing the fibres into a conical or cylindrical chamber against a perforated wall of which the fibres collect and form a batt as the air escapes from the chamber. The method is extremely slow and inefficient and produces but a single felt of limited size at each operation. The primary object of my invention resides in the production of a new and improved method of continuously forming fibres, including light and fluffy fur fibres of short length, into yardage felt of predetermined width and weight.

My invention contemplates the continuous feeding of the loose fibres to and forming them into a uniform web of predetermined width, continuously conducting the web onto a carrying surface moving longitudinally with the web and into overlapping relation thereonto to form a body or batt, including in its structure a plurality of laminations of the web, and the felting of the body into a relatively compact felted fabric as it passes a predetermined felting station and without interrupting the continuous feeding of the web onto the said surface. The felting is preferably continuous with the feeding of the web whereby progressively to felt the laminations into the body and into relatively compact felted form as the web laminations are fed thereonto. The web-carrying surface is preferably an endless conveyor driven in a single direction to form an endless body which is continuously and progressively felted as it passes the felting station. The process is continuous and the yardage felt thus produced is of a length corresponding to the length of said surface.

My preferred method of procedure employs a rotary carding machine, substantially modified from normal in both structure and function as and for the purpose hereinafter described, for forming the web. The fibres are mechanically fed to the card and mechanically worked thereon to distribute them uniformly thereacross and form a web of predetermined width and weight, and the web is led continuously from the card to and into an overlapping relation onto itself to form a body or batt of predetermined length and corresponding in width to the width of the web. The body is preferably endless and preferably continuously felted into a partially or wholly felted product in endless form as it passes the felting station, although the felting can be performed on an adjacent and cooperating felting apparatus, without interrupting the continuous feeding of the web, by cutting the batt and running it through such apparatus, all as hereinafter more specifically described. The production of a new and improved continuous method of this nature for producing yardage felt comprises a further object of the invention.

A further feature of my invention relates more particularly to novel and advantageous improvements in the felting method and apparatus employed. The laminated body to be felted is conducted horizontally along a predetermined path by and between two flexible bands, the bottom one of which is of burlap or like coarse fabric to which the body will adhere, and novel features of the invention consist in exerting surface contact pressure arcuately into and across the rear faces of the bands at a plurality of spaced, parallel and relatively adjacent locations along the path while effecting a vibrating action transversely of the body in the planes of said pressure contact at one of the faces, whereby causing the body to felt into a relatively compact fabric, and repeating the passage of the body along said path without removing it from the coarse carrier band. The apparatus for accomplishing these steps comprises two series of relatively adjacent and parallel rollers arranged in horizontal alignment along the said path and which rollers cooperate with the bands to provide arcuate surface felting pressure against both faces of the body as it passes along the felting path. The production of a new and improved felting method and apparatus of this nature and for the purpose described comprises a further object of the invention.

While my invention relates particularly to the felting of fur fibres which have been carroted and therefore adapted to rapid felting into yardage felt having predetermined characteristics of width, weight, density, composition, etc., it is apparent that in its broader aspects the invention is also adaptable to the felting of other loose fibres which can be fed into laminated web form and felted in the manner described to produce yardage felt, and the object of the invention includes the application of the novel method and apparatus to any of such fibres and fabrics.

These and other features of the invention will be best understood and appreciated from the following description of preferred embodiments thereof, selected for purposes of illustration and shown in the accompanying drawings in which—

Fig. 1 is a diagrammatic view in side elevation showing a preferred method and apparatus embodying my invention, Fig. 2 is a like view illustrating a modified form of the invention, Fig. 3 is an enlarged fragmentary plan view taken on line 3—3 of Fig. 1, Fig. 4 is a fragmentary sectional view vertically along and through the felting path, Fig. 5 is a fragmentary plan view of the top felting rollers, Fig. 6 is an enlarged sectional view taken on line 6—6 of Fig. 5, Fig. 7 is a fragmentary plan view of the bottom felting rollers, and Fig. 8 is a view taken on line 8—8 of Fig. 5.

My invention relates especially to the continuous production of yardage felt from fur fibres with or without admixture with other fibres, the product of the invention consisting either of wholly felted fabric or of a partially felted fabric which is suitable for further processing by conventional methods known to the trade and which consists of fulling, dyeing and finishing. Due to their soft fluffy and light weight characteristics, the handling of fur fibres during the initial stages of manufacture into fabric form has presented a considerable and difficult problem and, while such fibres have been heretofore handled by and along with air currents, I prefer to employ mechanical means of a carding nature for feeding, distributing and arranging the fibres and so construct and operate such means that air currents and the like which would destroy and interfere with the mechanical working of the fibres are quite substantially eliminated.

Machines which are used for the carding of wool are wholly impractical for carding and working fur fibres of the above described nature but I have discovered that when such machines are modified in certain respects, both structurally and functionally, they operate very efficiently on fur and like fibres. In the accompanying drawings I have illustrated such a modified carding apparatus as employed in my novel method for the continuous production of yardage felt in width up to 100 inches and in lengths of 40 yards or more and I shall now proceed to describe the same.

In accordance with the preferred form of my invention, the loose fibres to be formed into yardage felt are fed by a "Bramwell" type feeder A to web forming mechanism B. The feeder A is adapted to deliver loose fibres in predetermined amount and rate to and across the full width of an endless apron 10 which, in association with feed rollers 12 and licker-in roller 13, convey the fibres to a picker cylinder 14 which in turn conveys the fibres to the foraminous cylindrical surface 15 of a carding drum 16.

The web forming mechanism B is a conventional woolen card very substantially modified to adapt it to the handling of fur and like fibres. The foraminous surface 15 is constructed of a finer and softer card clothing wire throughout than that usually used for wool and other like fibres. The worker rollers 18 and strippers 19 are reduced in number and more widely spaced. I have illustrated the employment of three sets of workers and strippers whereas six to eight sets are normally employed in the carding of wool. The spacing between workers and strippers and main cylinder 16 is widened slightly so that the card wire coverings do not make as close a contact as required for normal operation. The workers and strippers are also driven in the same direction as the drum, thereby reversing their usual direction and functions, and the over-all speed of the card is reduced to approximately one-half of conventional speed. This reduction in speed slows down production from that required from a woolen card but is quite satisfactory for the needs of relatively high priced fur fibres and fabrics.

The manufacture of yardage felt in accordance with my invention demands first the continuous production of a uniform and fairly thick web of the required fibres and for such purpose it is not necessary to utilize the fine carding and combing required for woolen fibres. It is essential however that the fibres be moved forwardly on and with the cylindrical surface 15 and uniformly distributed thereover during passage of the fibres around the drum. Air currents and disturbances cause objectionable diffusion and losses of the light fur fibres and are highly objectionable to the proper and even distribution of the fibres over the surface 15, and to eliminate these objections and facilitate distribution of the fibres such disturbances are reduced to a minimum in the mechanism which I employ. The reduced number of workers and strippers and their greater spacing from the drum together with their rotation in reverse direction substantially minimizes the carding and like physical action on the fibres but provides sufficient action to effect an even distribution of the fibres. The reduction in the number of workers together with the reduction in speed of the card furthermore eliminates the disturbing air currents that are present in normal carding operations, whereby permitting the mechanical working and distributing of the fibres without causing the undesirable diffusion that would normally result from their light and fluffy nature. The operation is furthermore facilitated and loss of fibres reduced by the employment of a cover 20 over the worker portion of the drum and a solid grid 22 underneath the drum.

The fibres fed from the feeder A to the mechanism B are thus mechanically worked and evenly distributed uniformly into a web 23 during their passage around the drum. The web is slightly lifted from the drum by means of the usual brush roll and fancy 24 and is taken up by the doffer roll 25. A comb 26 serves to transfer the web from the doffer to an endless apron 28 which conducts it to the felting mechanism C.

The apron 28 is adapted to conduct the web onto a carrying surface at C movable longitudinally with and adapted to receive the web in overlapping laminations thereon to form a body including in its structure a plurality of laminations of the web. As illustrated in Fig. 1, this carrying surface is preferably disposed horizontally and is in the nature of an endless apron 30 adapted to receive and form the web into an endless body of web laminations and the body is preferably felted progressively into relatively compact form continuously and simultaneously with the feeding of the web thereon.

The felting mechanism C comprises the relatively long and endless apron 30 supported on rollers 31, 32 and 33 at its two extremities and driven from the roller 31. Cooperating with and superposed over a portion of the top reach of the apron 30 is a second endless apron 34, the two aprons cooperating to provide a vehicle for receiving and conducting the web along and through a predetermined felting path 35. The apron 34 is supported on rollers 36 and is driven only through its cooperation with the apron 30. The apron 30 is constructed of burlap or like coarse fabric to which the fur fibres of web 23 will tend to adhere while the apron 34 is constructed of cotton sheeting or like fine fabric to which the web will not adhere.

Cooperating with the apron 30 along the felting path 35 is a series of hollow brass rollers 38 disposed in relatively adjacent and parallel relation horizontally along the path beneath and supporting the apron. These rollers are driven in a direction to move the apron 30 forwardly by a shaft 39 and bevel gears 40. The rollers are heated by steam and the bearings are provided with steam inlets at 41 and exits at 42 for this purpose.

Cooperating with the apron 34 along the felting path 35 is a series of felting rollers 44, constructed preferably of wood or fibre covered, disposed horizontally in parallel relation above and alternately with respect to the rollers 38. The rollers 44 rest on the rear face of the apron 34 and are floatingly guided at their ends in vertical slots in brackets 45 and 46 permitting free vertical movement. Each bracket 45 comprises a vertical portion of a horizontal slide 48 having a yoke 49 holding therein a bearing block 50 (Fig. 8). A shaft 52 extending through the yoke is provided with eccentrics 54 respectively within the yokes and adapted to reciprocate the slides. Each bracket 45 is loosely but closely engaged by and between a collar 55 and lock nuts 56 whereby the rollers are permitted free movement vertically and are reciprocated or vibrated longitudinally with the slides, the other ends of the rollers being freely movable longitudinally and vertically in the brackets 46. The eccentrics are constructed to vibrate the rollers through a stroke of about one-half inch and are so arranged that the adjacent rollers are vibrated alternately in relatively opposite directions.

The apron 30 and rollers 38 are driven at a surface speed corresponding to the surface speed of the drum 16 and apron 28 whereby to receive the web 23 from the apron 28 and continue its movement along the path 35 between the aprons 30 and 34 and the rollers 38 and 44. Hot water sprays 58 are disposed above the rollers 44 to provide the moisture necessary to facilitate felting of the web and additional moisture and heat are provided beneath the apron 30 by steam pipes 60 having their upper portions perforated to project steam vapor sprays upwardly as illustrated in Fig. 4. The length of the product corresponds to the length of the apron 30 and embodies a predetermined number of laminations of the web 23. After passing through the felting path 35 the web continues to remain in contact with the endless apron 30, to the coarse fabric of which the fur fibres tend to adhere, and is conducted repeatedly to and through the felting path 35. An endless apron 62 of cotton sheeting and supporting rollers 64 are preferably provided beneath and cooperating with the bottom reach of the apron 30 to aid in supporting the endless web body 65 in its return to the forward end of the felting station.

The web 23 is taken continuously from the drum 16 and deposited continuously onto the moving apron 30 of the felting mechanism C. The web laminations are supported by and between the aprons 30 and 34 along its felting path 35 and are compressed and felted along such path by the action of the rollers 38 and 44. The felting is carried on continuously and progressively with the feeding of the web onto the apron 30 by the apron 28 and each additional web lamination is felted into the previously felted body 65 as the additional web lamination is fed thereonto and passed along the felting path 35. The number of laminations thus felted into the body 65 will depend upon the weight of felted fabric it is desired to produce and this factor can be automatically controlled by the employment of a lap measuring signal indicated at 66. This device is so geared to the mechanism at 32 that it gives a signal when the desired number of web laminations have been applied to the apron 30. The operators thereupon sever the body 65 thereacross, form its advancing end portion into a roll 68, and continue to roll the body up while supporting the roll on a pair of rollers 70. The continued operation of the machine and the feeding of the web 23 onto the body 65 and apron 30 are not interrupted during this removal of the felt body 65. The formation of a new body 65 on the apron is started by severing the web 23 at its junction with the final end of the body 65 and conducting the web end beneath the rollers 70 and continuing the web in contact with the apron 30.

As illustrated more particularly in Fig. 4, the rollers 38 and 44 are arranged alternately at opposite sides of the product being felted and aprons 30 and 34 are sufficiently loose to permit the rollers to exert surface contact pressure arcuately into and across the rear faces of the aprons. Thus, as the laminated body 65 is carried through the felting path 35 by and between the aprons 30 and 34, surface pressure is exerted thereon at its two faces while the vibrating action of the top rollers 44 function to felt the laminations together. Simultaneously therewith the proper amount of felting moisture is provided to the product from the hot water spray at 58 and steam vapor at 60 and felting heat is provided by the rollers 38 together with the steam from the pipes 60. Such combined functions operating simultaneously on the product serve to felt the fur fibre laminations into a fabric of desired predetermined density as it passes through the felting station.

The invention is adaptable to various modifications. For example, in Fig. 2 I have illustrated the felting as carried on independently of and following the formation of the web into an endless and non-felted batt. In this form of the invention the felting mechanism illustrated at $C^2$ is substantially the same as that illustrated at C and is indicated by like reference characters primed. The mechanism illustrated at C' is adapted to receive the web and form it into an endless and non-felted batt which is subsequently felted in the adjacent and cooperating mechanism $C^2$.

The mechanism at C' comprises an endless apron 75 having aprons 76, 77 and 78 of cotton sheeting cooperating therewith to aid in supporting the batt thereon. The web 80 is fed to the apron 75 in the same manner as above described in connection with the apron 30 and an endless batt 82 of the desired number of web laminations is formed by continuously overlapping the web onto itself as will be understood. An endless apron 84 of cotton sheeting cooperating with the apron 75 slightly to compress the laminations together can be employed if desired. When the batt 82 reaches the desired thickness or the desired number of laminations, the operators sever it transversely and feed the advancing end directly from the apron 75 into the felting mechanism C² which thereupon functions to felt the batt 82 into a felted fabric 85 in the manner above described in connection with the felting mechanism C. The new web 80 is severed from the batt 82 and continued on the apron 75 to form a new batt of the desired thickness. It should be understood that the invention is particularly applicable to fur felting and that the web and batt of such felting are so extremely delicate that they cannot be handled by conventional methods. By placing the entering end of the felting apparatus C² directly adjacent to the exit end of the batt forming apparatus C¹ I am able to lead the delicate batt directly from the apron 75 into the felting apparatus. It will be apparent that the uniting of the web forming apparatus, the batt forming apparatus and the felting apparatus for continuous and successive operation in accordance with my invention, is of particular importance in the manufacture of fur felt. When the felting is completed the product is rolled up at 68' in the manner already described in connection with the roll 68 in Fig. 1. It should be particularly noted that the continuous feeding of the web into the mechanism C' is not interrupted during this felting operation, and the formation of a new batt on the apron 75 is started and continued at C¹ during the felting at C² of the previously formed batt 82.

Having thus described my invention what I claim as new and desire to secure by Letters Patent of the United States is:

1. A continuous method of forming and felting fibres, including carroted fur fibres of short length, into a felted fabric strip of predetermined width and weight, which consists in feeding said fibres at predetermined rate to and forming them into a uniform web of predetermined width, conducting the web continuously onto an endless carrying surface moving longitudinally with and receiving the web in overlapping laminations thereon and forming it into an endless body including in its structure a predetermined plurality of laminations of said web, severing the body transversely and feeding it from said carrying surface through a felting station, providing felting heat and moisture to the body at said station while simultaneously therewith compressing and working the body into a flat felted fabric strip of reduced thickness, and continuing to form said web and feed it onto said surface uninterruptedly during said feeding and felting of the body to and at said felting station.

2. A continuous method of forming fibres into a felted fabric strip of predetermined width and weight, which consists in feeding loose fibres to and forming them into a uniform web of predetermined width, conducting the web onto an endless carrying surface moving longitudinally in the direction of the web and overlapping laminations of the web thereon to form an endless batt of predetermined thickness including in its structure a predetermined plurality of laminations of said web, severing the batt transversely, felting the batt into a relatively compact felted fabric by leading one end thereof directly from said carrying surface into a felting station and passing the batt through it, supporting the batt at said station under predetermined pressure between two parallel surfaces at its two faces while effecting a relative vibration of the pressure in and along the plane of and at one of said surfaces at and as the body passes said station, and providing felting heat and moisture to the body at said station.

3. The method defined in claim 2 in which the conducting of the web onto said surface is continuous during said severing and felting of the batt.

HUGO BOEDDINGHAUS.

REFERENCES CITED

The following references are of record in the file of this patent:

UNITED STATES PATENTS

| Number | Name | Date |
| --- | --- | --- |
| 8,821 | Bishop | Mar. 23, 1852 |
| 143,528 | Pollard | Oct. 7, 1873 |
| 248,660 | Marin | Oct. 25, 1881 |
| 268,276 | Perkins | Nov. 28, 1882 |
| 480,592 | Kittel | Aug. 9, 1892 |
| 1,535,324 | Lorenz | Apr. 28, 1925 |
| 1,782,764 | Parks | Nov. 25, 1930 |
| 1,984,700 | Reynolds | Dec. 18, 1934 |
| 2,093,709 | Casse | Sept. 21, 1937 |
| 2,169,372 | Pecker | Aug. 15, 1939 |
| 2,181,043 | Boeddinghaus | Nov. 21, 1939 |

FOREIGN PATENTS

| Number | Country | Date |
| --- | --- | --- |
| 239,481 | Great Britain | Oct. 15, 1925 |